UNITED STATES PATENT OFFICE.

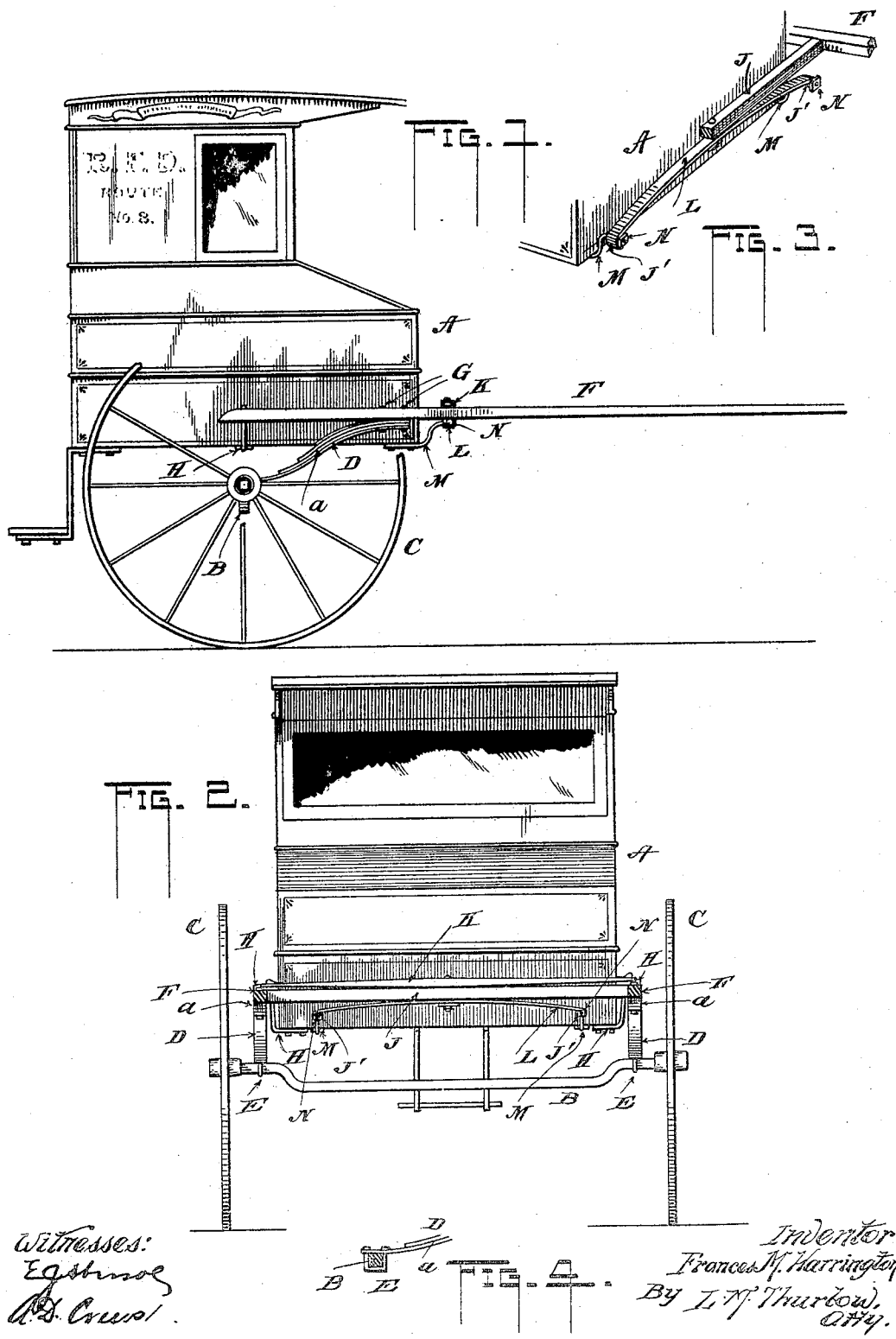

FRANCES M. HARRINGTON, OF PEORIA, ILLINOIS, ASSIGNOR TO THE HARRINGTON MANUFACTURING COMPANY, OF PEORIA, ILLINOIS, A CORPORATION OF ILLINOIS.

TWO-WHEELED VEHICLE.

No. 812,421.　　　Specification of Letters Patent.　　　Patented Feb. 13, 1906.

Application filed May 22, 1905. Serial No. 261,706.

*To all whom it may concern:*

Be it known that I, FRANCES M. HARRINGTON, a citizen of the United States, residing at Peoria, in the county of Peoria and State of Illinois, have invented certain new and useful Improvements in Two-Wheeled Vehicles; and I do hereby declare that the following is a full, clear, and exact description of the invention, which will enable others skilled in the art to which it appertains to make and use the same.

This invention has reference to improvements in two-wheeled vehicles, and particularly to that class used for mail-delivery purposes and in the carrying of milk. It is to be understood, however, that the cart to be described is adapted for all other uses as well as those named.

The object of the invention is to provide a two-wheeled cart that will be free of what is known as "horse motion." This objectionable motion is to be found in all two-wheeled vehicles now in use, at least in so far as I am at this time aware, and it is my purpose to produce a cart that will be free of such motion, no matter what the conditions may be.

In the appended drawings, which form a part of this application, Figure 1 is a side elevation of my improved cart. Fig. 2 is a front elevation of the same, showing my improvement. Fig. 3 is a perspective view of a portion of the front of the cart, showing a spring supported from a cross-piece of the shafts. Fig. 4 is a cross-section of the axle of the cart, showing manner of attaching a supporting-spring thereto.

The body of the cart (indicated by the reference-letter A) is supported on an axle B between the wheels C, as shown in Fig. 2, there being a spring D, composed, preferably, of a number of "leaves" $a\ a$, said spring being formed in a reverse curve, one end being secured to the said axle by means of a clip E, as illustrated in Fig. 4. The opposite end of the spring is secured to the shaft F by the bolts G. The form of the spring holds the shafts some distance above the axle, so that the body A, which is supported therefrom, will have sufficient room in which to rise and fall. It will be noted that the spring is secured some distance from the rear end of the shaft and that the free end of said shaft supports the body A by means of a hanger H at each side of the latter, one end being secured beneath said body and the other end resting upon and secured to said shaft, as will be understood by referring to Figs. 1 and 2. Between the shaft members F is the usual cross-piece J, to which the swingletree K is pivoted. To this said cross-piece J is secured a spring L, the same being fastened at its middle to the middle of the length of the cross-piece, the bolt which secures the swingletree in place answering also to hold said spring, though as a matter of fact other securing means may be employed, if desired. Each end of the spring is provided with a loop J', each of which receives the end of a hanger member M, threaded to receive a nut N. The opposite ends of the said hangers are secured to the under side of the body of the cart, the spring L thus serving to support said body at its forward end. By this arrangement the body is first supported at its center on the shafts F by means of the hangers H described, thereby permitting the said body to rock on that point if it were not for the fact that it is held at the forward end. However, by being hung from the middle the body will naturally teeter, this being about the center of gravity. The springs D are of sufficient strength to support the body and the weight within it, together with the driver, and yet allow it to have a yielding motion, such as is found in all vehicles. The portion of the device which I claim as my invention and which is the vital one is the adaptation of the spring L described. This member is of a very yielding nature, so that while the middle thereof is secured to the shafts, as described, and moves therewith the ends will practically maintain a fixed position, as said shafts vibrate vertically by the movements of the horse. It is evident that the weight of the loaded body A in being carried upon the flexible ends of the spring will maintain the fixed position described when said spring is properly adjusted as to length and flexibility. This results from the inertia of the body while the shafts move, the spring supporting said body.

Changes of one kind or another can be made as to the various parts and arrangement of my cart without departing from the spirit and intent of the invention. For instance, any style of spring may be used to replace the spring L that will accomplish the end sought.

I claim—

1. In a two-wheeled cart, the shafts, a spring secured at one end to each side member thereof substantially as shown, the opposite ends of the springs secured to the cart-axle, the cart-body suspended between the said rear extremities and secured thereto, a spring secured at the middle of its length to the connecting-bar of the shafts at right angles to the said side members thereof, the free flexing ends of the spring having connection with the front of the body.

2. In a two-wheeled vehicle the body thereof, the shafts therefor having the body located therebetween, said body having attachment with the rear ends, a spring secured at one end to each shaft, the other ends of the springs having attachment with the axle, and a third spring secured at its middle to the cross-bar of the shafts forward of the body its ends having connection with said body for yieldingly supporting the forward end thereof.

3. In a two-wheeled vehicle, the shafts, the body located therebetween and secured substantially at its middle to the end of each, a spring secured to each shaft forward of the point of connection with the body, the rear ends of the springs secured to the axle beneath the said point of body connection, and a spring secured at its middle to the cross-bar of the shaft and from the ends of which the forward end of the body is hung substantially as shown.

4. In a two-wheeled vehicle the shafts, the cart-body secured to and between and balanced upon the rear ends thereof, the axle being located below the point of connection of the shafts and body, a spring secured to each shaft member forward of the axle and extending to said axle and secured thereto, and a spring on the cross-bar of the shafts forward of the body, the latter being suspended at its forward end from the free end of said spring.

5. In a two-wheeled vehicle, the shafts, the body located between the rear ends thereof and secured thereto at its center of gravity, the axle just below the point of connection, a half-spring secured at one end to each shaft member and at the other to the axle, a spring secured at its middle to the connecting-bar of the shafts forward of the body and parallel with the axle, and pivotal connection between the spring ends and the said body.

6. In a two-wheeled vehicle, the shafts, the body located therebetween, and secured substantially at its middle to the end of each, a spring secured to each shaft forward of the point of connection with the body, the rear ends of the springs secured to the axle beneath the said point of body connection, a third spring secured at its middle to the cross-bar of the shafts at right angles to the latter, members attached to the body and extending forward therefrom and having loose connection with the free flexing ends of the said third spring substantially as described.

In testimony whereof I affix my signature in presence of two witnesses.

FRANCES M. HARRINGTON.

Witnesses:
E. J. ABERSOL,
L. M. THURLOW.